April 20, 1937.  C. W. FLOSS  2,077,751
VEHICLE BODY CONSTRUCTION
Filed Jan. 14, 1935   3 Sheets-Sheet 1
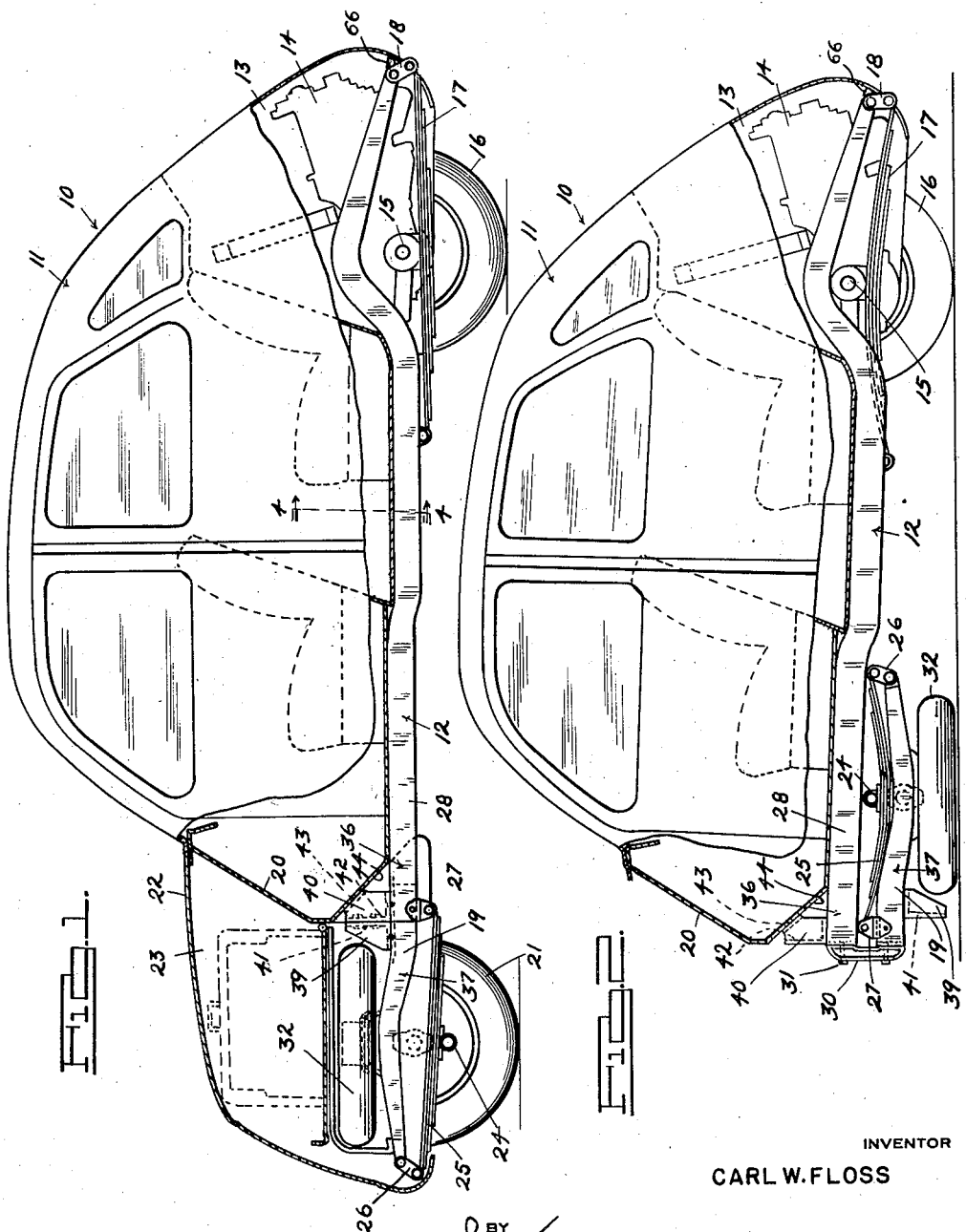
INVENTOR
CARL W. FLOSS
BY
ATTORNEYS

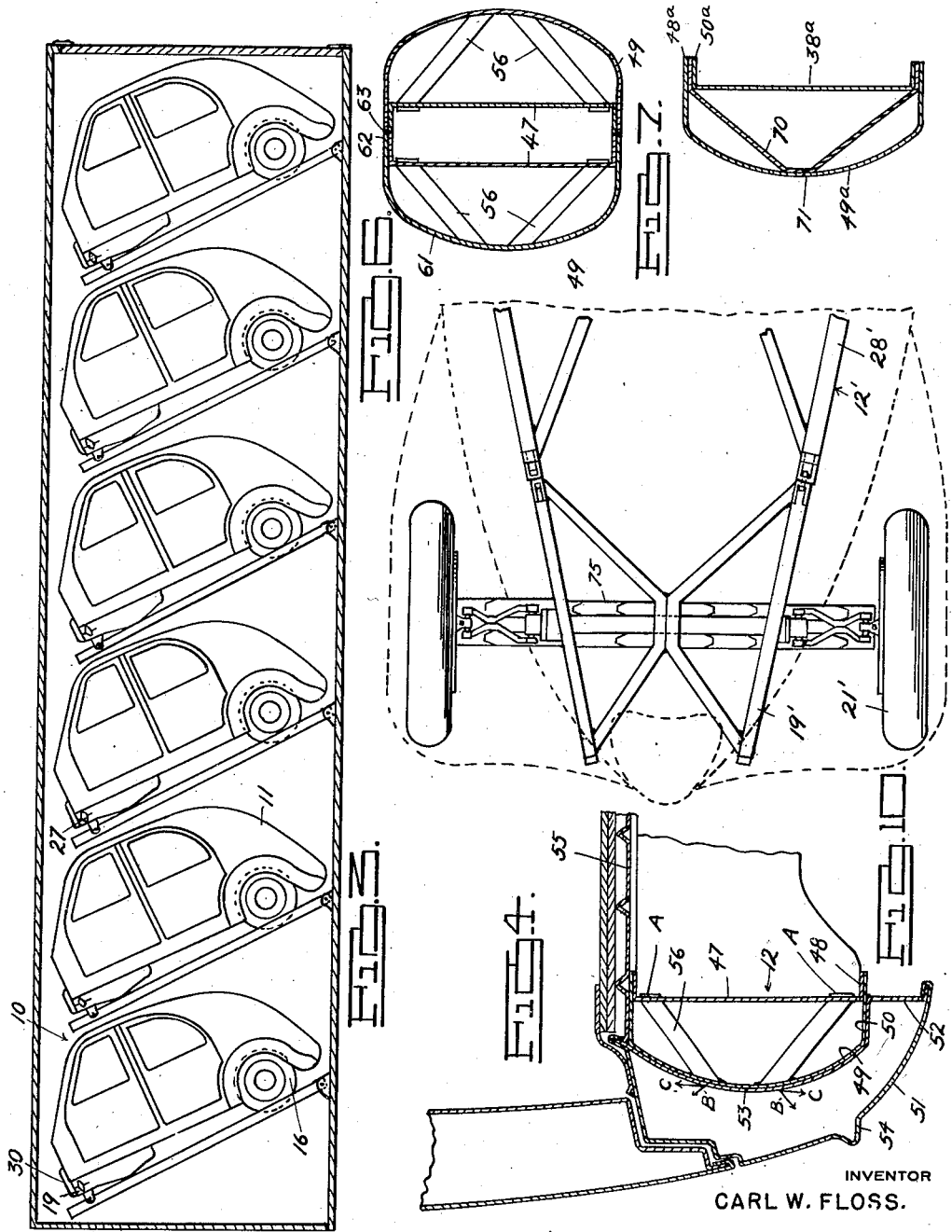

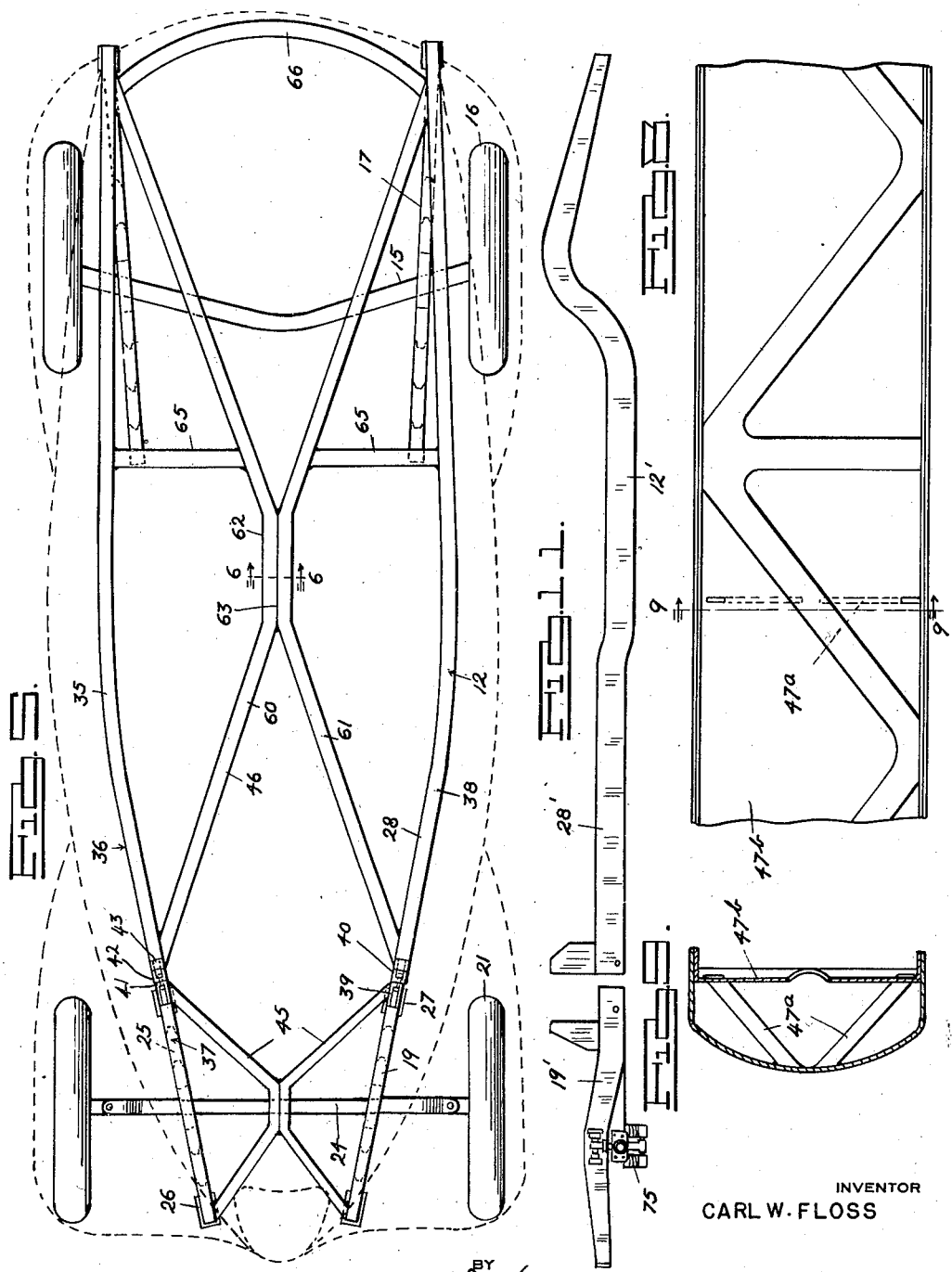

Patented Apr. 20, 1937

2,077,751

UNITED STATES PATENT OFFICE 2,077,751

VEHICLE BODY CONSTRUCTION

Carl W. Floss, Detroit, Mich.

Application January 14, 1935, Serial No. 1,736

18 Claims. (Cl. 280—106)

This invention relates generally to motor vehicles and refers more particularly to improvements in vehicle body and chassis constructions.

The present invention contemplates appreciably reducing the cost of manufacture of motor vehicles by effecting a material reduction in the total weight of the body and frame structure, and it is one of the principal objects of this invention to accomplish the above results with a construction actually having greater torsional rigidity than the heavier structures heretofore produced, and thereby offering the possibility of increasing the performance of the vehicle without correspondingly increasing the size of the power plant. As a matter of fact, by reducing the combined weight of the body and associated frame structure of a vehicle of a given size, the weight of the torque transmission mechanism may also be reduced and, if desired, the cubic foot displacement of the internal combustion engine may be correspondingly reduced without interfering with the ratio of the car weight to the cubic feet of engine displacement required for satisfactory performance. It necessarily follows from the foregoing that, with the present invention the required ratio aforesaid may be appreciably reduced without interfering with the size of the power plant heretofore employed for propelling vehicles of the same size, in which event the performance of the vehicle is materially increased.

Another feature of this invention rendering it possible to secure the foregoing results resides in the provision of a construction having a combination of features resulting in a more advantageous distribution of loads on the stressed members. In accordance with this invention, the extremely high stresses, usually concentrated in the neighborhood of the dash in a motor vehicle having the power plant situated at the front end thereof, are substantially relieved, rendering it possible to secure the further feature of this invention of detachably securing the portion of the vehicle in advance of the dash to the remaining portion thereof without affecting the rigidity of the construction. This latter feature is advantageous in that it not only permits interchangeably employing standard and independently sprung wheel assemblies at the front end of the vehicle, but in addition permits storing the vehicles in a space having a length substantially less than the length of the vehicle in running condition, thereby effecting a material reduction in the cost of shipping.

A further object of this invention resides in the provision of a frame assembly composed of side sill members hollow in cross section to withstand high torsional strain and internally braced against buckling by suitably arranged tension members. The construction is such as to permit forming the frame members of relatively light gage metal comparable, in passenger cars, to the gage of the sheet metal body panels but, of course, variable in dependence upon the load and stress distribution of the particular type of vehicle to be manufactured. In the case of a vehicle powered by a unit located at the rear of the body, the greatest concentrated loads are imposed upon the rear portion of the body structure, and these portions are particularly suitable for carrying the increased load without additional bracing, due to the absence of large door openings in this portion of the body structure.

A still further object of this invention resides in the provision of a frame assembly comprising side sill members having a cross sectional contour predetermined to form a substantially tubular construction when two of the members are secured together in juxtaposition. The tubular cross section is highly effective to resist torsion and advantage is taken of this characteristic in the frame assembly by providing a cross brace composed of members having the same cross sectional contour as the side sills and having a portion extending longitudinally of the vehicle substantially midway between the sills formed by securing the members back to back to provide the tubular section previously referred to.

Still another object of this invention resides in the provision of a frame assembly composed of composite frame members having the several parts thereof welded together and also welded to the vehicle body structure so as to form an integral unitary construction possessing great rigidity.

The foregoing, as well as other objects, will be made more apparent as this description proceeds, especially when considered in connection with the accompanying drawings, wherein:

Figure 1 is a side elevational view of a motor vehicle constructed in acordance with this invention;

Figure 2 is a view similar to Figure 1, showing the portion of the vehicle in advance of the dash removed and clamped beneath the frame assembly of the vehicle;

Figure 3 is a diagrammatic view disclosing the manner in which vehicles constructed in accordance with this invention may be stored in a relatively compact space for shipping;

Figure 4 is a cross sectional view taken on the plane indicated by the line 4—4 of Figure 1;

Figure 5 is a plan view of the frame assembly;

Figure 6 is a cross sectional view taken on the plane indicated by the line 6—6 of Figure 5;

Figure 7 is a view similar to Figure 4, showing a modified form of construction;

Figure 8 is a side elevational view of another modified form of frame member;

Figure 9 is a cross sectional view taken on the plane indicated by the line 9—9 of Figure 8;

Figure 10 is a view similar to Figure 5 showing a modified form of spring suspension system; and Figure 11 is a side elevational view of the chassis illustrated in Figure 10 showing the front assembly detached from the rear assembly.

Referring now to the drawings, it will be noted that there is illustrated in Figure 1, a motor vehicle 10 having a body 11 and having a chassis 12 supporting the body. The body may be of any suitable design, but is preferably provided with a space 13 at the rear thereof of sufficient dimension to house the power plant diagrammatically indicated in Figure 1 by the reference character 14. The power plant 14 is suitably mounted upon the rear end of the chassis and is operatively connected to the rear axle 15 for driving the road engaging wheels 16 mounted upon the opposite ends of the axle 15 in the usual manner. In accordance with conventional practice, the axle 15 is suspended from the chassis by means of suitable leaf springs 17 extending longitudinally of the vehicle on opposite sides of the chassis and having the central portions thereof fixedly secured to the axle. The rear ends of the springs 17 are connected in the usual manner to the rear end of the chassis by means of the shackles 18 and the forward ends of the springs are pivotally mounted upon the chassis in a manner to be more fully hereinafter described.

The forward end portion 19 of the chassis projects beyond the dash 20 of the body and, in addition to carrying the road engaging steering wheels 21 of the vehicle, also cooperates with a removable hood 22 to provide a storage compartment 23 in advance of the body. In the embodiment of the invention shown in Figure 1, the steering wheels 21 are swively mounted in the usual manner upon the opposite ends of an axle 24 extending transversely of the portion 19 of the chassis and connected to the latter portion by means of the leaf springs 25. The springs 25 also extend longitudinally of the vehicle and are secured intermediate the ends to the front axle 24. The forward ends of the springs 25 are connected to the corresponding ends of the portion 19 of the chassis by means of the shackles 26, and the rear ends of the springs are pivotally connected to the portion 19 through the medium of suitable brackets 27.

By supporting the power plant 14 at the rear end of the vehicle instead of at the forward end of the same, the extremely high stresses usually present in the latter type of construction in the locality of the dash of the vehicle body are greatly relieved, and advantage is taken of this desirable characteristic in the present instance by detachably securing the portion 19 of the chassis to the remaining portion 28 thereof at a point adjacent the dash 20 of the body. In other words, the construction is such as to permit the portion 19 of the chassis to be readily removed from the remaining portion 28 whenever desired and, since the road engaging wheels 21, axle 24, springs 25, and associated parts are carried by the portion 19 of the chassis, it necessarily follows that these parts are removable as an assembly from the portion 28 of the chassis. The demountability of the front end assembly or portion 19 of the chassis from the remaining portion 28 is desirable in that it not only permits readily interchanging the assembly 19 for an assembly embodying individually sprung front wheels, but also materially decreases the cost of shipping.

In connection with the feature of reducing the shipping costs, attention is directed to Figure 2, wherein the front end assembly or portion 19 of the chassis is shown as detached from the portion 28 and positioned beneath the latter portion. It will, of course, be understood that the front wheels 21 are removed prior to locating the portion 19 in the position thereof shown in Figure 2, but with this exception, all of the remaining parts of the front end portion 19 of the assembly shown in Figure 1 are retained in assembled relation. The front end portion 19 of the chassis may be secured in the position thereof shown in Figure 2 to the portion 28 of the chassis by means of auxiliary brackets 30 designed to abut the free ends of both the aforesaid portions of the chassis and to be secured thereto by means of the fastener elements 31. It may be pointed out at this time that the wheel 32, shown in Figure 2 as secured to the portion 19 of the chassis, is the spare wheel usually provided with motor vehicles, and in the assembled relationship of the two portions of the chassis shown in Figure 1, the spare wheel 32 assumes a position in the compartment 23 beneath the hood 22.

By moving the front end assembly or portion 19 of the chassis 12 from a position in coextensive relation to the rear portion 28 to an inverted position beneath the latter portion in the manner shown in Figure 2, the over-all length of the vehicle is reduced an amount equal to the length of the front end assembly. This permits storing the vehicle in a space substantially less than the normal over-all length of the vehicle with substantially all of the parts of the latter intact, and the desirability of this construction will be apparent from Figure 3, wherein it is shown that it is possible to store at least six vehicles of a given wheel base in a standard freight car having a length of 40 feet, 6 inches, as distinguished from prior practice of storing only four vehicles of the identical wheel base in a freight car of the same length. It may be pointed out at this time that the available space in a freight car of the above size existing at the sides of the vehicles is more than sufficient to receive the few parts of the vehicle it is necessary to detach, to wit: the hood 22, and front road engaging wheels 21. Hence the provision of a detachable front end assembly of the type previously set forth offers the possibility of materially reducing the shipping cost, and in addition, permits readily interchanging the front end assembly 19 for assemblies of different construction.

In connection with the interchangeability feature, attention is directed to the embodiment of the invention featured in Figure 10, showing a chassis 12' identical in construction to the chassis 12, with the exception that the front end assembly 19' is equipped with a spring suspension system permitting deflection of the road engaging wheels 21' independent of each other. Otherwise the front end assembly 19' is exactly the same as the corresponding assembly 19 and may be secured to the remaining portion 28' of the chassis in exactly the same manner as the assembly 19 is secured to the portion 28. Furthermore, the front end assembly 19' may be moved from the position thereof shown in Figure 10 to an inverted position beneath the assembly 28' of the chassis and may be secured in this inverted position in the same manner previously set forth in connection with the front end assembly 19, to reduce the over-all shipping length of the vehicle. The embodiment of the invention featured in Figure 10 is merely set forth at this point to more clearly illustrate one of the important advantages resulting from demountably securing the front end assembly 19 to the front end of the assembly 28 and will be more fully hereinafter described.

It has been stated above, that the demountability feature of the front end assembly 19 of the chassis is a direct result of relieving the stresses on the forward end portion of the chassis by supporting the power plant of the vehicle upon the rear end of the chassis. There are, however, a number of other advantages which result from supporting the power plant at the rear end of the vehicle, and several of the advantages resulting from this construction are as follows: (1) greater tractive ability due to concentrating more weight on the driving wheels of the vehicle; (2) reducing the steering effort of the front wheels of the vehicle without resorting to abnormally high ratios due to the fact that less weight is distributed upon the front wheels; (3) reducing the overall height of the vehicle without sacrificing head clearance within the body, due to the absence of the usual propeller shaft; (4) rendering it possible to secure more practical streamlining of the vehicle resulting, in not only reducing the fuel cost for relatively high vehicle speeds, but also results in reducing the wind noises in the passenger compartment of the body; (5) elimination of practically all engine and transmission noises in the passenger compartment due to the fact that these power units are located in the rear of the body in such a manner that any noises resulting from the operation thereof are carried away from the passenger compartment; and (6) appreciably increasing the riding comfort by permitting the location of the seats in the body between the axles of the vehicle.

A vehicle constructed in accordance with the present invention possesses all of the foregoing advantageous features and, in addition, is constructed in such a manner that the total weight thereof is considerably less than the total weight of vehicles of the same wheel base heretofore commercially produced, with the result that the cost of manufacture of the present vehicle is correspondingly reduced. As will be more fully understood as this description proceeds, the reduction in weight and cost is not effected by sacrificing rigidity or performance. On the contrary, the rigidity of the vehicle is actually increased by a more advantageous distribution of the stresses on the chassis frame and, if an internal combustion engine is used having a displacement approximating engines of the type heretofore commercially employed for propelling vehicles of the same wheel base, the performance of a vehicle constructed in accordance with this invention is actually increased, due to the more advantageous ratio between the weight of the vehicle and the cubic feet of engine displacement. It, of course, follows from the foregoing that in designing a vehicle in accordance with this invention, the ratio of the total car weight to the cubic foot displacement of the engine may be maintained the same as the corresponding ratio of vehicles of the same size heretofore produced, by employing an internal combustion engine of less cubic foot displacement than the engines resorted to in the past to secure the desired ratio in vehicles of the same size.

In general, the reduced weight of my improved vehicle is effected by a more advantageous distribution of the loads on the stressed members, and by a more efficient use of material in constructing the chassis of the vehicle. Although the gage of the metal employed in forming the chassis frame will vary in dependence upon variations in the size of the vehicle and the load to be carried thereby, nevertheless, I have determined that sufficient rigidity may be secured in a vehicle of the pleasure car type by constructing the frame of a material having a gage approximating the gage of the body panels. Obviously, this practice offers the possibility of materially reducing the weight of the chassis and, in the present instance, is accomplished in such a manner as to likewise also reduce the cost of manufacture of the chassis. In detail, the chassis 12 comprises a frame 35 having coextensive sections 36 and 37. The section 36 forms the frame for the chassis portion 28, while the section 37 forms the frame for the chassis portion 19, and both of these sections are provided with coextensive longitudinally extending sills 38 having the adjacent ends telescopically engaging each other and demountably secured together at the dash line 20 of the body by means of complementary brackets 39 and 40. The brackets 39 are provided with base portions rigidly secured to the rear ends of the sills of the front frame section 37 and are provided with upwardly extending vertical webs 41 adapted to be bolted or otherwise suitably detachably secured to the corresponding web portions 42 of the complementary brackets 40. The latter brackets are also provided with base portions fixedly secured to the forward end portions of the sills of the rear section 36 of the frame and, in addition, are provided with lateral flanges 43 welded or otherwise suitably secured to the portion 44 of the dash 20. The sills for the front frame section 37 are secured in lateral spaced relation to each other by means of a cross brace 45 of the alphabet type, and the sill members for the rear frame section 36 are secured in proper spaced relation to each other by a similar cross brace 46.

Referring now more in detail to the particular construction of the sills 38, it will be noted from Figure 4, that the latter are substantially D-shaped in cross section and are formed from a relatively light gage metal comparable to the metal employed in forming the side panels of the body. Each of the D-shaped sills comprises an inner longitudinally extending frame member 47 having inwardly extending terminal flanges 48 at the top and bottom edges thereof for stiffening purposes. Cooperating with the inner frame member 47 to form the D-shaped cross sectional contour of the sill is an outer frame member 49 also extending longitudinally of the frame and having inwardly extending flanges 50 at the top and bottom edges thereof overlapping the flanges 48 and welded or otherwise permanently secured to the latter flanges. The portion of the frame member 49 connecting the terminal flanges 50 is spaced laterally outwardly from the plane of the member 47 and is bowed outwardly with respect to this plane giving the construction the appearance of a "D" in cross section. The frame member 49 may also be formed of relatively light gage metal, and in the present instance is reinforced by the body sill 51. As shown in Figure 4, the body sill 51 is provided with an inner panel 52 having a portion 53 conforming in shape to the member 49 and welded or otherwise suitably secured to this member to provide, in effect, a double thickness of metal. The marginal edges of the panel 52 are secured to corresponding edges of the outer panel 54 of the sill in such a manner that the latter also reinforces the frame member 49 through the medium of the inner panel 52. A certain amount of additional strength is imparted to the sills 38 by the sheet metal ribbed flooring 55 having the marginal edges welded to the upper flanges 50 on the member 49 to provide a unitary construction.

In addition to the foregoing, the sills are effectively braced against buckling by means of suitable tie strips 56 secured under tension within the hollow sills at points spaced longitudinally of the latter. The space between the tie strips within the sills will, of course, depend upon the nature and thickness of the material used in the construction, as well as upon the stress conditions. In Figure 4, I have shown the strips 56 as arranged in pairs with each pair located in a vertical plane. In detail, the inner ends of the strips 56 are welded or otherwise permanently secured to the frame member 47 adjacent the longitudinal edges of the latter, and the outer ends of the strips are permanently secured to the bowed portion of the frame member 49 upon opposite sides of a horizontal median plane passing through the sills. In other words, the strips 56 are inclined in directions toward each other from the inner ends to the outer ends thereof and the latter ends are spaced a slight distance from each other.

From the foregoing it will be observed that the tie strips 56 are under tension, and the action of these strips to prevent buckling of the sills will now be described. Assuming that the curved portion of the outer frame member 49 of one of the sills tends to move outwardly under a bending load, and assuming that the tie strips tend to pivot at the point A, the resultant tendency at the other end of the strips would be to transmit a load normal to the tie strips such as indicated at B in the direction shown in Figure 4, and which may be resolved into the loads C, essentially in line with the material of the D member at this point. As shown in Figure 4, the loads C are transmitted to the D member in opposite directions from the outer ends of the tie strips with the result that the material of the D member at the points of connection of the outer ends of the tie strips therewith will be stressed with a tension load. In this connection, it may be pointed out that the D-shaped sill members are comparatively free from stress at the foregoing points before the tension load previously set forth is applied to the D members. As a matter of fact, a stress analysis of the D-shaped sills reveals that prior to placing the aforesaid tension load on the sills, the latter are merely subjected to horizontal and transverse shear at the points of connection of the outer ends of the tie strips with the bowed members 49 of the sills, due to the bending loads upon the latter. It is generally recognized that horizontal shear at the neutral axis of a stressed member under the bending loads is negligible when the length of the member is at least twelve times the depth, as is the case in the present instance. On the other hand, the transverse shear generally results in a small unit stress and may also be considered as negligible. Consequently, the addition of the tension loading previously described is well within the safe working strength of the material, even though the latter is of relatively narrow gage.

Thus from the foregoing, it will be observed that I have provided a frame having side sills composed of composite members substantially D-shaped in cross section and internally braced through the medium of tension members. It will also be apparent that the construction is such as to permit forming the sill members of a relatively light gage material, while at the same time maintaining the rigidity required for commercial use in the production of motor vehicles.

The stability of the chassis frame 35 and particularly the torsional rigidity thereof is materially increased by the cross members 45 and 46. In the present instance, these cross members are of the "X" type and are also formed from a relatively light gage metal. As shown in Figure 5, the forward extremities of the "X" 45 are welded or otherwise fixedly secured to the forward ends of the sills forming the frame section 37, and the rear ends of the "X" are similarly secured to the corresponding ends of the aforesaid sills. The "X" member 46 extends for substantially the full length of the section 36 of the frame and is permanently secured to the sills 38 in the same manner as the "X" member 45.

In the present instance, each of the X-shaped braces is formed of a pair of frame members 60 and 61. These members are preferably indentical in construction to the sills 38 previously described, and the reference characters employed in designating the several parts of the composite sill members 38 are duplicated in Figure 6 to indicate the corresponding parts of the frame members 60 and 61 forming the X-shaped braces.

As shown in Figure 5, the frame members 61 and 60 are provided with portions 62 intermediate the ends thereof extending in the direction of length of the vehicle, and disposed upon opposite sides of the longitudinal center line of the chassis. These portions of the X-shaped braces are perhaps best shown in Figure 6 of the drawings, and as will be observed from this figure, the marginal edges of the flanges 48 and 50 of the frame members are welded in abutting relationship as at 63, with the result that the portions 62 of the X-shaped braces are substantially tubular in cross section providing maximum torsional rigidity. The X-shaped brace 46, in addition to having the opposite ends permanently fixed to the frame section 36, is also connected intermediate its ends to the latter frame section by means of tubular braces 65 having the outer ends permanently secured to the side sills of the frame section 36 and having the inner ends permanently fixed to the X-shaped brace 46. The location of the braces 65 is preferably such as to permit supporting the forward ends of the rear springs 17 thereon, so that a portion of the weight carried by these springs is substantially evenly distributed upon the X-shaped brace 46 and side sills of the frame section 36. In addition to the braces 65, I provide a transverse tubular brace 66 at the rear end of the chassis having the opposite ends permanently secured to the sills of the frame section 36 at substantially the points of connection of the rear end of the X-shaped brace 46 with the frame section 36.

As previously stated, the body of the vehicle is preferably welded to the portion 28 of the chassis in order to provide a unitary construction possessing maximum rigidity. In assembling the body on the portion 28 of the chassis by welding, the floor is welded to the side members and also to the X-shaped brace 46 of the frame section 36. The outer ends of the tie strips 56 are preferably welded to the inner surface of the frame members 49 in their proper spaced relationship, while the inner ends of these strips project through suitable slots formed in the frame member 47 and are welded to the latter to form an integral construction. The body sill 51 and side panels of the body are welded to the D-shaped sill members and also the floor 55 of the body, and the rear body panel is preferably welded to the cross brace 66, which is curved in the manner shown in Figure 5 to conform to the contour of this rear body panel. By reason of the above construction, a rigid interconnection of the component parts of the vehicle is accomplished and relative movement between these parts is absolutely prevented, which is considered essential in order to obtain maximum structural efficiency with the minimum amount of material.

The feature of rigidly securing the vehicle body to the section 36 of the chassis frame to form an integral unit is particularly important at the rear end of the vehicle, since the greatest concentrated loads are imposed upon the structure at this end, due to the fact that the power plant is supported upon the latter end. In other words, by welding the portion of the body housing the power plant to the chassis frame, this portion of the body serves to effectively reinforce the part of the frame carrying the highly concentrated loads transmitted by the power plant, and in all normal constructions sufficient stability will be provided by the body without the use of complicated and expensive torsional bracing.

In Figure 7 of the drawings, I have illustrated a slightly modified form of sill member 38a for the chassis frame having the same general cross sectional contour as the sill member 38 previously described, but differing therefrom in the particular construction of the bracing employed. In the embodiment of the invention featured in Figure 7, the D-shaped sill is internally braced by a one-piece substantially V-shaped strip 70 extending the full length of the sill with a portion 71 at the apex welded or otherwise permanently secured to the inner surface of the bowed frame member 49a at the center of the latter and having the extremities permanently secured between the horizontal flanges 48a and 50a. It will, of course, be apparent that the leg portions of the V-shaped strip 70 are disposed in planes extending at right angles to the planes in which the strips 56 are disposed, but notwithstanding this difference, the strip 70 is also under tension and functions in substantially the same manner as the strips 56 to resist buckling of sills.

In Figures 8 and 9, I have shown still another modified form of sill member differing from the one featured in Figure 4 in that the vertical web or frame section 47b of the composite sill is reinforced to not only increase the resistance of the sill to buckling, but to also provide greater torsional rigidity. In the present instance, the sill is effectively reinforced without increasing the weight thereof by forming integral ribs in the section 47a in the manner clearly illustrated in Figure 8. As will be observed from this figure, the ribbing simulates, in effect, a "Warren Truss", although various other arrangements may be resorted to, depending upon the results desired.

The embodiment of the invention shown in Figure 10 has been previously referred to as differing from the first described form of the invention in the particular construction of the front end chassis assembly 19'. This latter assembly is interchangeable with the assembly 19 of the chassis 12 forming the subject matter of the first described embodiment of this invention, and differs essentially from the latter in that the suspension system 75 is of the type permitting independent displacement of the road engaging wheels 21'. The particular design of the suspension system 75 selected herein for the purpose of illustration forms no part of this invention, and may be any one of the various accepted constructions. With the exception of the suspension system previously discussed, the chassis shown in Figure 10 may be identical in construction to the chassis illustrated in Figure 1 and reference is made to the description of the latter for the details of construction of the chassis shown in Figure 10.

What I claim as my invention is:

1. In a motor vehicle, a chassis having a frame provided with a sill of hollow cross section, means within the structural element for reinforcing the latter including a brace having one end permanently secured to one side of the sill adjacent one longitudinal edge thereof and having the opposite end secured to the opposite side of the sill adjacent the longitudinal median line of the latter side, and a cooperating brace located in a common plane with the brace aforesaid, said cooperating brace having one end secured to the first named side of the sill opposite the edge aforesaid and having the other end secured to the second mentioned side of the sill adjacent the longitudinal median line of the latter.

2. In a motor vehicle, a chassis having a structural element of hollow cross section, means within the structural element for reinforcing the latter including a brace having one end permanently secured to one side of the element adjacent one longitudinal edge thereof and having the opposite end secured to the opposite side of said element adjacent the longitudinal median line of the latter side, and an opposed cooperating brace having one end secured to the first named side of the structural element adjacent the longitudinal edge thereof opposite the edge aforesaid of the same and having the other end secured to the second named side of the structural element adjacent the longitudinal median line of the latter side.

3. In a motor vehicle, a chassis having a structural element of hollow cross section, and means for reinforcing the structural element including a substantially V-shaped brace having the apex permanently secured to one longitudinally extending side of the element at the longitudinal median line of the latter side and having the extremities of the leg portions permanently fixed to the opposite side adjacent the longitudinal edges thereof.

4. In a motor vehicle, a chassis provided with a structural element of hollow cross section having one side transversely curved outwardly with respect to the opposite side, and means for reinforcing the structural element including a substantially V-shaped brace located within the structural element with the apex thereof secured to the inner surface of the outwardly curved side adjacent the longitudinal median line thereof and with the extremities of the leg portions secured to the opposite side of the element adjacent the longitudinal edges thereof.

5. In a motor vehicle, a chassis having a composite structural element of hollow cross section comprising a frame section having laterally extending flanges at the opposite longitudinal edges thereof, a second frame section having laterally extending flanges at the opposite longitudinal edges thereof extending into the frame section aforesaid, and a substantially V-shaped brace located within the structural element with the apex thereof permanently secured to the first named frame section at the longitudinal median line thereof and having the leg portions permanently secured between the lateral flanges of said sections.

6. In a motor vehicle, a frame assembly having a composite structural element of hollow cross section comprising a transversely curved longitudinally extending frame section having flanges extending laterally in the same direction from the opposite longitudinal edges thereof, a second longitudinally extending section located between said flanges and permanently secured thereto, and bracing located within said element and extending transversely of the element from the opposite longitudinal edge portions of one side wall of the hollow structural element to the opposite side wall thereof substantially midway between the longitudinal edges.

7. In a motor vehicle, a frame assembly having a composite structural element of hollow cross section comprising a transversely curved longitudinally extending frame section having flanges extending laterally in the same direction from the opposite longitudinal edges thereof, a second longitudinally extending section located between said flanges and permanently secured thereto, and braces located within the structural element and extending in opposite directions from the portion of the first section substantially midway between the longitudinal edges thereof to the second section adjacent the longitudinal edges thereof.

8. In a motor vehicle, a chassis comprising front and rear frame assemblies demountably secured together in coextensive relation and each having laterally spaced sills, cross bracing extending between the sills of the rear frame assembly comprising a frame member of hollow cross section having longitudinally spaced portions secured to one of the latter sills and having a portion intermediate said portions extending in the direction of length of the chassis between the sills of the rear frame assembly, a second frame member of hollow cross section having longitudinally spaced portions secured to the other sill of the rear frame assembly and having a portion intermediate the latter portions permanently secured to the intermediate portion of the first named frame member forming with the latter a tubular section extending longitudinally of the chassis between the sills of the rear frame assembly, and cross bracing for the front frame assembly similar in construction to the cross bracing aforesaid and having the tubular section located in alignment with the tubular section of the cross bracing for the rear frame assembly.

9. In a motor vehicle, a frame assembly having laterally spaced sills, cross bracing interconnecting the sills having a portion of substantially tubular cross section extending longitudinally of the frame assemby midway between the sills, and reinforcing means located within the tubular portion comprising laterally spaced longitudinally extending webs having the opposite longitudinal edges permanently secured to opposite walls of the tubular portion.

10. In a motor vehicle, a frame assembly having laterally spaced sills, cross bracing interconnecting the sills having a portion substantially tubular in cross section extending longitudinally of the frame assembly midway between the sills, and means within the tubular portion for reinforcing the latter comprising longitudinally extending frame members cooperating with each other to form a box-like construction within the tubular portion and having the opposite longitudinal edges thereof permanently secured to opposite walls of the tubular portion.

11. In a motor vehicle, a frame assembly having laterally spaced composite sills of hollow cross section, said sills comprising an outer longitudinally extending frame section transversely bowed outwardly with respect to the longitudinal center line of the frame assembly and having inwardly extending marginal flanges at opposite longitudinal edges thereof, a second longitudinally extending frame member disposed between the flanges aforesaid and having the longitudinal edges thereof permanently secured to said flanges, and a body sill having a portion conforming in shape to the first named frame member and embracing the outer surface of the transversely curved portion of said frame member.

12. In a motor vehicle, a frame assembly having laterally spaced composite sills of hollow cross section, said sills comprising an outer longitudinally extending frame section transversely bowed outwardly with respect to the longitudinal center line of the frame assembly and having inwardly extending marginal flanges at opposite longitudinal edges thereof, a second longitudinally extending frame member disposed between the flanges aforesaid and having the longitudinal edges therof permanently secured to said flanges, a body sill having a portion conforming in shape to the first named frame member and embracing the outer surface of the transversely curved portion of said frame member, and transverse bracing within the hollow sill extending between the portion of greatest curvature of said first named section to the second named section adjacent the longitudinal edges of the latter.

13. In a motor vehicle, a frame unit having composite structural element comprising longitudinally extending frame members permanently secured together and cooperating to form a construction of substantially box section, and bracing within said structural element extending in opposite directions from the portion of one wall of the box section substantially midway between the longitudinal edges thereof to the opposite wall of the box section adjacent the longitudinal edges of the latter.

14. In a motor vehicle, a frame unit having a structural element of box section, and bracing within said element extending in opposite directions from the portion of one side wall of the box section substantially midway between the longitudinal edges of the latter wall to the opposite wall of the box section adjacent the longitudinal edges thereof.

15. In a motor vehicle, a frame unit having a structural element of box section, and transverse bracing within the element extending from the portion of one wall of the box section substantially midway between the longitudinal edges of the latter wall to the opposite wall of the box section adjacent the longitudinal edges thereof and arranged under tension between said walls.

16. In a motor vehicle, a frame unit having a structural element of box section and having one side wall of the structural element curved transversely of the element in an outward direction, and transverse bracing within the box section extending in opposite directions from the transversely curved wall substantially midway between the longitudinal edges of the latter wall to the opposite wall adjacent the longitudinal edges thereof.

17. In a motor vehicle, a frame assembly having laterally spaced sills, cross bracing extending between the sills comprising a frame member of hollow box section having longitudinally spaced portions secured to one of the sills and having an intermediate portion extending in the direction of length of the frame assembly between the sills, a second frame member of hollow box section having longitudinally spaced portions secured to the other sill and having an intermediate portion extending in the direction of length of the frame assembly adjacent the intermediate portion of the first frame member, said intermediate portions cooperating with each other to form a tubular section extending longitudinally of the frame assembly between the sills and being secured together with the adjacent walls thereof spaced laterally from each other to provide a box section within said tubular section.

18. In a motor vehicle, a frame assembly having laterally spaced sills, cross bracing extending between the sills comprising a frame member of channel-shaped cross section having longitudinally spaced portions secured to one of the sills and having an intermediate portion extending in the direction of length of the frame assembly between the sills, a reinforcing member of channel-shaped cross section secured in the channel of said frame member with the channel thereof opening in the same direction as the channel of the frame member and with the base of said channel spaced from the base of the channel of the frame member to provide a box section, a second frame member of channel-shaped cross section having longitudinally spaced portions secured to the other sill and having an intermediate portion extending in the direction of length of the frame assembly adjacent the intermediate portions of said first frame member, the longitudinal edges of the flanges of the channel of the second frame member being secured to the adjacent longitudinal edges of the channel of the first frame member to provide a tubular section extending longitudinally of the frame assembly between the sills, and a reinforcing member of channel-shaped cross section secured in the channel of the second frame member with the channel opening toward the channel of the first named reinforcing member and having the longitudinal edge portions of the flanges thereof secured to the corresponding edge portions of the flanges of the first named reinforcing member to provide a box section within said tubular section.

CARL W. FLOSS.